(12) United States Patent
Choi

(10) Patent No.: US 9,036,525 B2
(45) Date of Patent: May 19, 2015

(54) PACKET TRANSMISSION METHOD AND APPARATUS OF MOBILE TERMINAL

(71) Applicant: Samsung Electronics Co. Ltd., Suwon-si, Gyeonggi-do (KR)

(72) Inventor: Sunggyu Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 13/746,901

(22) Filed: Jan. 22, 2013

(65) Prior Publication Data

US 2013/0194993 A1    Aug. 1, 2013

(30) Foreign Application Priority Data

Jan. 26, 2012    (KR) .......................... 10-2012-0007560

(51) Int. Cl.
*H04W 52/02*    (2009.01)
*H04L 29/08*    (2006.01)
*H04W 76/04*    (2009.01)

(52) U.S. Cl.
CPC ........ *H04W 52/0222* (2013.01); *H04W 76/045* (2013.01); *H04L 67/14* (2013.01); *H04L 67/16* (2013.01)

(58) Field of Classification Search
CPC .......... H04W 52/0222; H04W 76/045; H04L 67/14; H04L 67/16
USPC .................. 370/311, 346, 350, 449
See application file for complete search history.

(56) References Cited

U.S. PATENT DOCUMENTS

| | | | |
|---|---|---|---|
| 7,698,409 B2* | 4/2010 | Kohonen | 709/223 |
| 2002/0167917 A1* | 11/2002 | Stephenson et al. | 370/319 |
| 2008/0154913 A1* | 6/2008 | Kohonen | 707/10 |
| 2008/0298386 A1* | 12/2008 | Fiatal | 370/449 |
| 2009/0275349 A1* | 11/2009 | Bae et al. | 455/466 |
| 2009/0307715 A1 | 12/2009 | Santamaria et al. | |
| 2011/0134936 A1* | 6/2011 | Andreoli-Fang et al. | 370/449 |
| 2011/0151944 A1* | 6/2011 | Morgan | 455/574 |
| 2011/0153728 A1* | 6/2011 | Einarsson et al. | 709/203 |
| 2012/0170496 A1* | 7/2012 | Yang et al. | 370/311 |

FOREIGN PATENT DOCUMENTS

| | | | |
|---|---|---|---|
| GB | 2476354 A | 6/2011 | |
| KR | 10-2012-0076859 A | 7/2012 | |

* cited by examiner

*Primary Examiner* — Brian D Nguyen
(74) *Attorney, Agent, or Firm* — Jefferson IP Law, LLP

(57) ABSTRACT

A method and an apparatus for transmitting a packet used in establishing or maintaining a connection with a server are provided. The method includes determining, when a current time is a packet transmission of at least one network service application of the mobile terminal, whether at least one other network service application having an adjustable packet transmission schedule with a packet transmission after the current time exists, adjusting, when the at least one other network service application exists, the adjustable packet transmission schedule to synchronize the packet transmission occasions of the at least one network service application with the at least one other network service application, and simultaneously transmitting a packet of the network service application having the packet transmission occasion at the current time and a packet of the at least one other network service application of which packet transmission schedule is adjusted.

16 Claims, 11 Drawing Sheets

PACKET TRANSMISSION METHOD AND APPARATUS OF MOBILE TERMINAL

PRIORITY

This application claims the benefit under 35 U.S.C. §119 (a) of a Korean patent application filed on Jan. 26, 2012 in the Korean Intellectual Property Office and assigned Serial No. 10-2012-0007560, the entire disclosure of which is hereby incorporated by reference.

BACKGROUND OF THE INVENTION

1. Field of the Invention

The present invention relates to a packet transmission method and apparatus. More particularly, the present invention relates to a method and apparatus for transmitting a packet for use in establishing or maintaining a connection with a server.

2. Description of the Related Art

With the increasing consumer demand and diversity of mobile device applications, use of mobile devices, which may also be referred to as mobile terminals, is growing at a rapid pace. Particularly, smartphones, and other similar mobile terminals, are designed to download the applications from an online market to be installed and executed on the smartphones. Recently, many mobile terminals may execute embedded push applications, for example an instant messenger application or a push email client, or may have the capability to install such applications downloaded from the online market.

Such a push application may periodically transmit a keep-alive packet to a server in order to maintain a connection to a corresponding network service even when the service is not used. A transmission interval of the keep-alive may be referred to as heartbeat interval. With periodic receipt of the keep-alive packet, the server maintains the connection with a mobile terminal.

The push applications installed in the mobile terminal may transmit the keep-alive packet to the server at a predetermined heartbeat interval. In a case where the mobile terminal operates in an idle mode for saving battery power, the mobile terminal may wake up, or in other words, exit the idle mode, in order to transmit the keep-alive packet to the server, thereby consuming high electric current and battery power instantaneously. Accordingly, frequent keep-alive packet transmission may cause a waste of battery power, resulting in reduction of operation time of the mobile phone.

Accordingly, there is a need for reducing a number of wakeup times of the mobile terminal operating in idle mode in order to increase a usage time of the mobile terminal battery. The number of wakeup times may be reduced by synchronizing respective heartbeat intervals of different push applications installed on a same mobile terminal. This method may reduce the power consumption due to the frequent keep-alive packet transmission by synchronizing the heartbeat intervals of all push applications operating in the mobile terminal with that of a specific push application (e.g. the shortest heartbeat interval) selected among them. However, this method may cause a side effect. Although a selected push application having the shortest heartbeat interval is not forced to transmit extra and/or unnecessary keep-alive packets, the other push applications may be synchronized forcibly to the heartbeat interval of the selected push application such that certain applications have to transmit unnecessary keep-alive packet. This means that the keep-alive packet transmission amount increases while the number of wakeup times decreases, which may cause a burden from the view point of the server. That is, the keep-alive time synchronization method may result in a traffic overload to the server, resulting in degradation of service quality. Furthermore, the increased traffic may cause a billing problem in view of the mobile terminal.

Therefore, there is a need for a method and apparatus for transmitting a packet for use in establishing or maintaining a connection with a server that reduces battery power consumption on a mobile terminal and that does not cause a traffic overload in a server.

SUMMARY OF THE INVENTION

Aspects of the present invention are to address at least the above-mentioned problems and/or disadvantages and to provide at least the advantages described below. Accordingly, as aspect of the present invention is to provide a packet transmission method and apparatus of a mobile terminal that is capable of minimizing the side effect caused by the heartbeat interval synchronization while reducing battery power consumption.

Another aspect of the present invention is to provide a packet transmission method and apparatus of a mobile terminal that is capable of minimizing the traffic load caused by the heartbeat interval synchronization while prolonging the usage time of the mobile terminal.

In accordance with an aspect of the present invention, a packet transmission method of a mobile terminal is provided. The method includes determining, when a current time is a packet transmission occasion of at least one network service application of the mobile terminal, whether at least one other network service application having an adjustable packet transmission schedule with a packet transmission occasion after the current time exists, adjusting, when the at least one other network service application having the adjustable packet transmission schedule with the packet transmission occasion after the current time exists, the adjustable packet transmission schedule of the at least one other network service application to synchronize the packet transmission occasions of the at least one network service application with the at least one other network service application, and simultaneously transmitting a packet of the network service application having the packet transmission occasion at the current time and a packet of the at least one other network service application of which packet transmission schedule is adjusted.

In accordance with another aspect of the present invention, a packet transmission apparatus of a mobile terminal is provided. The apparatus includes a control unit which selects, when a current time is a packet transmission occasion of at least one network service application, at least one other network service application and adjusts a packet transmission schedule of the selected at least one other network service application, and a radio communication unit which simultaneously transmits a packet of the network service application and a packet of the selected at least one other network service application.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
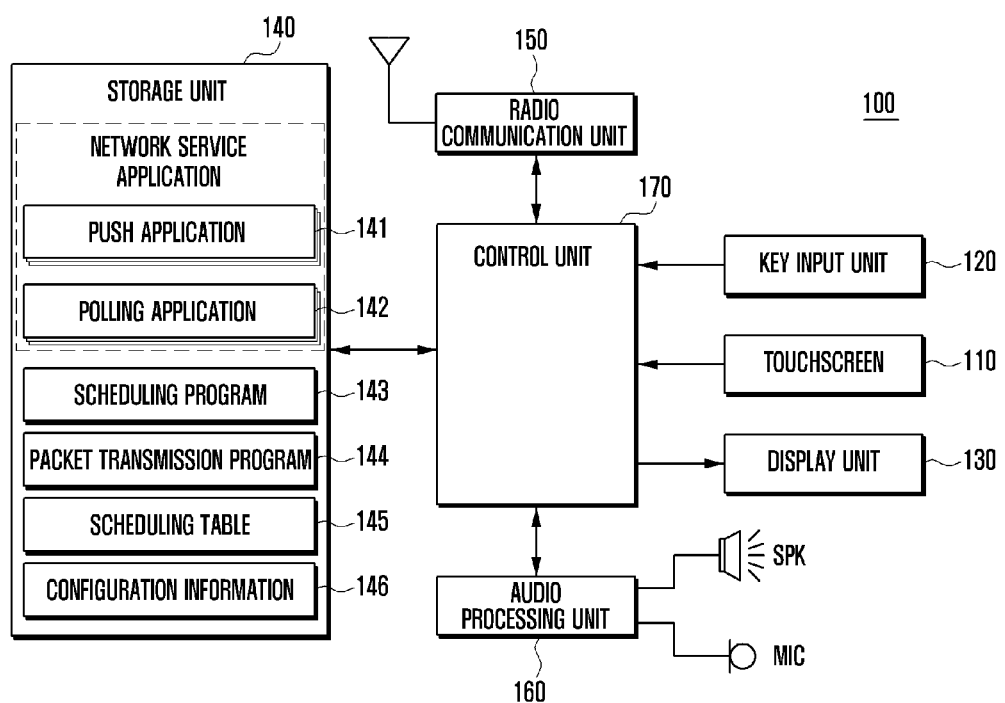
FIG. 1 is a diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be understood that the following description of exemplary embodiments of the present invention are provided for illustration purpose only and there may be various equivalents and modified examples that can replace the embodiments described in the present specification and the configuration shown in the drawings at the time of filling the present application. In the drawings, certain elements may be exaggerated or omitted or schematically depicted for clarity of the exemplary embodiments of the invention, and the actual sizes of the elements are not reflected. Thus, the present invention is not limited in the relative sizes of the elements and distances therebetween.

It is to be understood that the singular forms "a," "an," and "the" include plural referents unless the context clearly dictates otherwise. Thus, for example, reference to "a component surface" includes reference to one or more of such surfaces.

In the present exemplary embodiments, the term 'network service' denotes a service for the mobile terminal for exchanging various types of messages through a network. Here, the message may be capable of including data, text, images, video, audio, other multimedia contents and any other suitable data or information that may be transmitted and received in a network.

In the present exemplary embodiments, the term 'network service application' denotes the application that enables the network service. Such network service applications may include Social Network Service (SNS) applications, for example Facebook and Twitter, email service applications, for example, a push email client, Post Office Protocol version 3 (POP3), Internet Mail Access Protocol version 4 (IMAP4), Exchange ActiveSync (EAS), or any other similar and/or suitable email service app, Instant Messenger applications, text and video chatting service applications for peer-to-peer or group chatting or video-conferencing, message service applications, for example SMS and MMS, and widget service applications providing information on weather, stock, and news, and any other similar and/or suitable applications.

In the present exemplary embodiments, the network service application may be categorized as one of a push application and a polling application. The push application establishes a connection with a server and transmits a signal to the server periodically in order to maintain the connection. For example, the push application transmits a keep-alive packet at a predetermined heartbeat interval to a push server. When a data transmission, for example a message addressed to the mobile terminal, is to be transmitted, the push server transmits the message to the mobile terminal. Meanwhile, if there is no data transmission on a network resource allocated to the mobile terminal for a predetermined time duration, the communication operator of the push server releases the connection with the mobile terminal. Accordingly, the push server may not transmit the message addressed to the connection-released mobile terminal. Such a policy may be used by a communication operator in order to use communication resources efficiently. Under such a policy, a battery power consumption of the mobile terminal may be conserved by increasing a heartbeat interval. With respect to a communication operator or network service provider, however, a prolonged heartbeat interval increases the number of connections to the mobile terminals, resulting in traffic overload. Meanwhile, the polling application accesses the server periodically in order to poll the message. The polling application operates such that the mobile terminal periodically accesses the server in order to request a message and to receive the message transmitted by the server in response to the request. The aforementioned POP3, IMAP4, and widget applications are examples of polling applications.

In the present exemplary embodiments, the term 'idle state' denotes a state wherein an operating mobile terminal consumes a least amount of electric current. If a packet transmission is to occur, the mobile terminal operating in the idle state wakes up. That is, the control unit of the mobile terminal switches from the idle mode to a packet transmission mode. In the present exemplary embodiments, the term 'packet transmission mode' denotes a state in which the mobile terminal transmits the packet. In the packet transmission mode, the control unit of the mobile terminal may control a radio communication unit to transmit a single packet or multiple packets simultaneously. At this time, the difference between the electric currents consumed for the single packet transmission and the simultaneous multiple packets transmission is small enough to be negligible. Accordingly, it is preferred to simultaneously transmit as many of the packets as many as possible.

The packet transmission method and apparatus described with reference to the exemplary embodiments may be applicable to all the types of mobile terminals and other mobile electronic devices that perform radio and/or wireless communications. The mobile terminals may be any of a smartphone, a tablet Personal Computer (PC), a hand-held and/or portable PC, a Portable Multimedia Player (PMP), a Personal Digital Assistant (PDA), and any other similar or suitable portable electronic device.

The packet transmission method and apparatus of the exemplary embodiments may be capable of prolonging a usage time of the mobile phone battery such that the mobile terminal respectively adjusts the packet transmission schedules of the network service applications and transmits the packets according to the respectively scheduled packet transmission scheduling. The packet schedule adjustment and transmission methods according to the exemplary embodiments are described hereinafter. Detailed description of well-known functions and structures incorporated herein may be omitted to avoid obscuring the subject matter of the present invention.

In the following descriptions, the term 'app' is used interchangeable with the term 'network service application.'

FIG. 1 is a diagram illustrating a configuration of a mobile terminal according to an exemplary embodiment of the present invention.

Referring to FIG. 1, a mobile terminal 100 may include a touchscreen 110, a key input unit 120, a display unit 130, a storage unit 140, a radio communication unit 150, an audio processing unit 160, a microphone MIC, a speaker SPK, and a control unit 170.

The touchscreen 110 may cover a part of or an entire front surface of the display unit 130 in order to receive a touch gesture from a user and in order to generate a corresponding touch event that may be provided to the control unit 170. The control unit 170 may detect the touch gesture according to the touch event received from the touchscreen 100 and may control the aforementioned components of the mobile terminal 100 in response to the detected touch gesture. Herein, the touch gesture may be any of touch, tap, long tap, drag, sweep, or any other similar or suitable user generated touch gesture. The touch is a touch gesture in which the user makes a contact at a position on the screen. The tap is a touch gesture in which the user makes a contact and releases the contact at a position on the screen without movement of the contact position. The long tap is a touch gesture in which the user makes a contact for a relatively long time and releases the contact as compared to the tap. The drag is a touch gesture in which the user makes a contact at a position and moves the contact to another position on the screen. The sweep, or flick, is a touch gesture in which the user makes a skimming motion with a finger and/or touch input device as if flipping a page of a book. The touchscreen 110 may be a resistive type touch panel, a capacitive type touch panel, an electromagnetic induction type touch panel, or any other suitable and/or similar type of touch panel.

The key input unit 120 may include a plurality of input keys for receiving alphanumeric inputs and function keys for configuring various functions, or any other similar and/or suitable keys. The function keys may be implemented in the form of navigation keys, side keys, and shortcut keys configured to perform predetermined functions. The key input unit 120 may generate key events related to the user configuration and the function control of the mobile terminal and provide the key events to the control unit 170. The key events may be any of a power on/off event, a volume adjustment event, a screen on/off event, or any other similar and/or suitable type of event. The control unit 170 may control the aforementioned components of the mobile terminal 100 in response to the key event.

The display unit 130 may display the digital data input through the control unit 170 in an analog format under the control of the control unit 170. That is, the display unit 130 may display various mobile terminal operation screens, e.g. a lock screen, a home screen, various application execution screens, or any other similar and/or suitable screen. The lock screen may be an image displayed when the screen of the display unit 130 is turned on but operation of the mobile terminal 100 is locked. If a touch gesture for unlocking the screen is detected, the control unit 170 may switch the lock screen to the home screen, an application execution screen, or any other suitable screen. The home screen may be a plurality of application icons corresponding to the respective applications or may be any other screen displayed allowing a user to execute operations and/or applications. If one of the icons is selected by the user, the control unit 170 executes the application represented by the icon. At this time, the display unit 130 displays the execution screen of the application. The display unit 130 may display one of the aforementioned screens as the main screen and another as a sub-screen overlapped on the main screen under the control of the control unit 170. The display unit 130 may be any of a flat display panel of a Liquid Crystal Display (LCD), an Organic Light Emitting Diode (OLED) display, an Active Matrix Organic Light Emitted Diode (AM-OLED) display, or any other similar and/or suitable display type.

The storage unit 140 may store an Operating System (OS) of the mobile terminal, applications that are executable on the mobile terminal 100, data including text, audio, and video files, any user generated data, and/or any other similar and/or suitable data. The storage unit 140 may include a program region and a data region.

The program region of the storage unit 140 may store the OS for booting up the mobile terminal and for managing the operations of the internal components and various applications. Particularly in an exemplary embodiment of the present invention, the program region may store a push app 141, a polling app 142, a scheduling program 143, and a packet transmission program 144. Each of the applications stored in the program region may be an embedded application, a downloaded application or a third party application.

The scheduling program 143 may manage the packet transmission schedules of the applications installed in the mobile terminal 100 and may detect the network activation events generated by the applications. If a network activation event is detected, the scheduling program 143 may control the packet transmission program 144 to transmit the packet of the application indicated by the detected network activation event. At this time, the scheduling program 143 may search for the applications available for simultaneous packet transmission from among the other applications by referencing the scheduling table and may adjust the packet transmission schedules of the found applications.

The scheduling program 143 may determine the application available for schedule adjustment according to a predetermined determination condition. The determination condition may be whether the packet transmission occasion is variable. The push application 141 may be the application with the variable packet transmission occasion. That is, the packet transmission occasion of the push application 141 may be adjusted within a predetermined range of heartbeat interval. In contrast, the packet transmission occasion of the polling application 142 may be set to a fixed value determined at a predetermined heartbeat interval. In the present exemplary embodiment, it is assumed that the packet transmission occasion of the push application 141 is variable within the predetermined range of the heartbeat interval for convenience purpose, and it is assumed that the packet transmission occasion of the polling application 141 is fixed.

Under these assumptions of the present exemplary embodiment, the scheduling program 143 considers other push applications, besides the push application 141, as the targets of schedule adjustment. The polling applications may be not considered as the target applications for schedule adjustment. However, the present invention is not limited thereto, and the network activation event may be generated regardless of the type of application. In further detail, when the scheduling program 143 transmits the packet of the application indicated by the detected event, if the indicated application is a push application, then the schedule of the indicated push application is moved up to the current time. As a consequence, the scheduling program 143 controls to transmit the packets simultaneously at the current time. On the other hand, if the indicated application is a polling application, the scheduling program 143 controls to transmit the packet of the indicated polling application without schedule adjustment.

The determination condition may include a time difference in addition to whether the packet transmission occasion is adjustable. In detail, the scheduling program calculates a difference between the current time and the next packet transmission occasion of the application. If the difference is less than a predetermined value, e.g. 1 minute, i.e. if the next packet transmission occasion of the application is within 1 minute from the current time, the scheduling program 143 may move up the schedule of the corresponding application to the current time in order to transmit the packets simultaneously at the current time. Otherwise, if the difference is equal to or greater than the predetermined value, the scheduling program may only transmit the packet of the application corresponding to the detected event at the current time without adjusting the schedule of other applications.

The scheduling application 143 may take the two aforementioned determination conditions into account when performing the schedule adjustment function. For example, if the application having the next packet transmission occasion is the push application 141 and if the calculated difference is less than the predetermined value, the scheduling program 143 may move up the transmission schedule of the corresponding application to the current time so as to be simultaneously transmitted with the packet of the push application 141 corresponding to the detected event. Otherwise, the scheduling program 143 controls such that only the packet of the push application 141, or any other application, corresponding to the detected event is transmitted without schedule adjustment.

The packet transmission program 144 may control the radio communication unit 150 in order to transmit the packet. In further detail, the packet transmission program 144 may be responsible for the push notification function for controlling the radio communication unit 130 to transmit the keep-alive packet to the push server and may be responsible for the polling function for controlling the radio communication unit 130 to request the polling server for a message and to receive the message transmitted by the polling server in response to the request. Meanwhile, the push application 141 may include the push notification function. The polling application 142 may include the polling function.

The data region of the storage unit 140 may store data generated in the course of using the mobile terminal or may store downloaded data. The data region may also store the aforementioned screens presented on the display unit 130 and may store copied data to be pasted. Particularly according to an exemplary embodiment, the data region may store a scheduling table 145 and configuration information 146. The scheduling table 145 may be a time data listing packet transmission schedules of the applications stored in the mobile terminal 100 in temporal order. The scheduling table 145 may be configured by the scheduling program 143. The configuration information 146 may include various configuration values related to the operation of the mobile terminal Particularly, the configuration information 146 may include configuration values indicating whether the corresponding applications support a change to packet transmission schedules. The configuration information 146 may also include a reference value to be compared with the calculated difference value.

The radio communication unit 150 may receive voice communication, video communication, data communication, and digital broadcast signals under the control of the control unit 170. Particularly in an exemplary embodiment, the radio communication unit 150 may transmit the keep-alive packet to the push server. The radio communication unit 150 may also connect to the polling server to request a message and to receive the message transmitted by the polling server in response to the request. Accordingly, the radio communication unit 150 may include a cellular communication module, a short range wireless communication module (e.g. Wi-Fi module, Bluetooth module or NFC (Near Field Communication) module), a digital broadcast module, or any other suitable and/or similar communication module.

The audio processing unit 160 may convert a digital audio signal input by the control unit 170 into an analog audio signal to be output through the speaker SPK and may convert an analog signal including voice input through the microphone MIC into a digital audio signal to be input to the control unit 170 under the control of the control unit 170.

The control unit 170 may control overall operations and signal flows of the internal components of the mobile terminal 100 and may process data of the mobile terminal 100. The control unit 170 may also control the power supply from the battery to the internal components of the mobile terminal 100. The control unit 170 may also execute the OS and applications stored in the program region of the storage unit 140. Particularly, in an exemplary embodiment, the control unit 170 may execute the push app 141, the polling app 142, the scheduling program 143, and the packet transmission program 144. That is, the control unit 170 may control schedule adjustments and packet transmissions.

Figure 2:
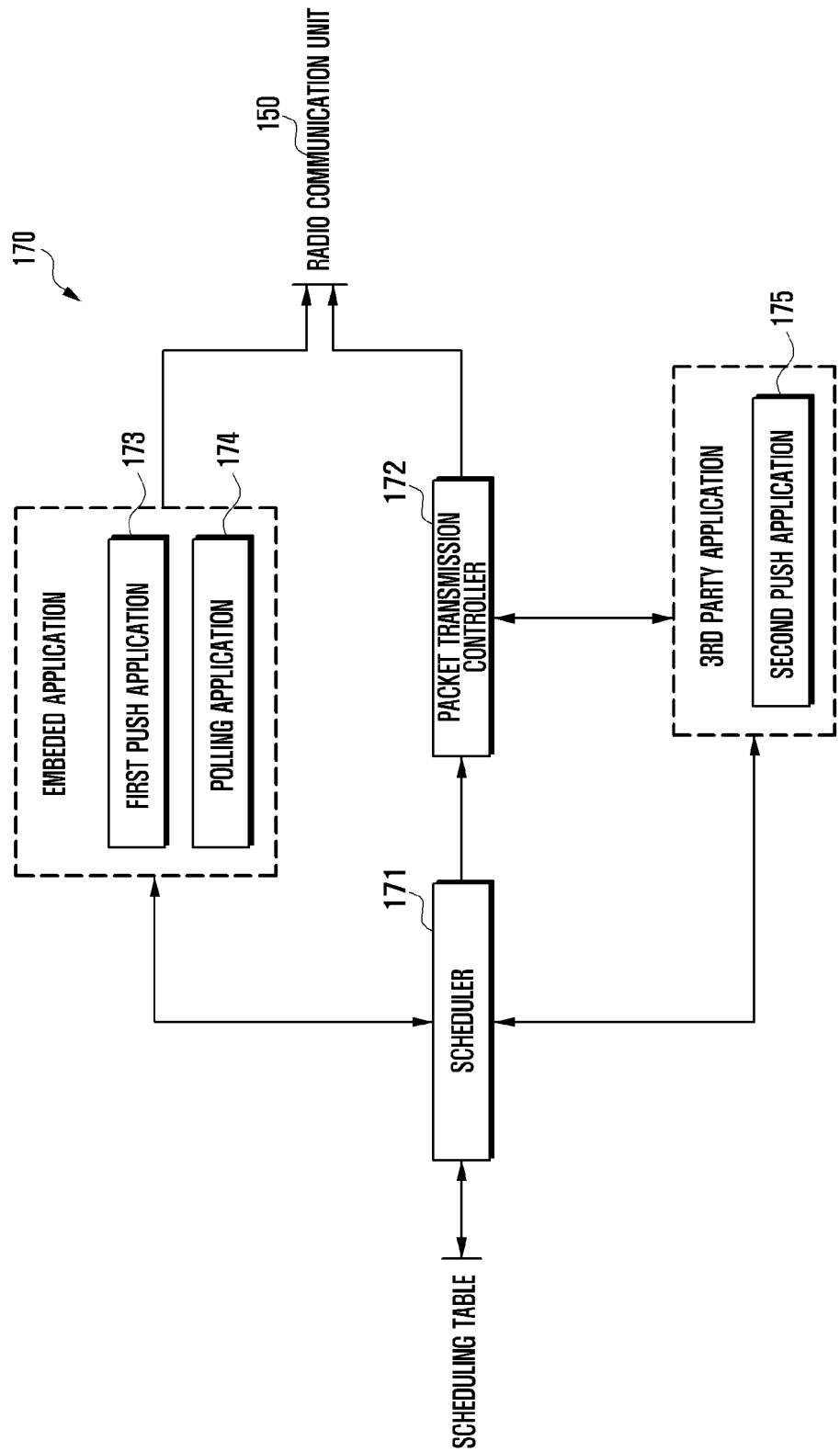
FIG. 2 is a block diagram illustrating a configuration of the control unit of FIG. 1 according to an exemplary embodiment of the present invention.

FIG. 2 is a block diagram illustrating a configuration of the control unit of FIG. 1 according to an exemplary embodiment of the present invention.

Referring to FIG. 2, the control unit 170 may include a scheduler 171, a packet transmission controller 172, a first push app 173, a poling app 174, and a second push app 175. The first push app 173 and the polling app 174 may be embedded applications. The second push app 175 may be a third party application. The first push app 173, the polling app 174, and the second push app 175 respectively issue a network activity event to the scheduler 171 at their packet transmission occasions. If the network activation event is detected, the scheduler 171 controls the packet transmission controller 172 to transmit the packet of the application corresponding to the detected event. At this time, the scheduler 171 references the scheduling table 145 in order to determine whether there is any application available for simultaneous packet transmission among the other applications and, if so, adjusts the packet transmission timing of corresponding ones of the other applications. The scheduler 171 may also determine which applications support schedule adjustment according to a predetermined condition.

Since the scheduler 143 corresponds to the above-described scheduling program 143, detailed description thereof is omitted herein. The packet transmission controller 172 performs the push notification function for controlling the radio communication unit 150 in order to transmit the keep-alive packet to the push server. The packet transmission controller 172 also performs the polling function for controlling the radio communication unit 150 in order to request the polling server for a message and to receive the message transmitted by the polling server in response to the request. Meanwhile, the push notification function may be included in the push application 173. Also, the polling function may be included in the polling application 174.

Although not enumerated herein, the mobile terminal 100 may also further include other components, for example a GPS module and a camera module. According to an exemplary embodiment of the present invention, some of the internal components of the mobile terminal 100 may be omitted, combined, or replaced by other components according to a design choice. According to an exemplary embodiment of the present invention, additional input units may be implemented with at least one of a touch pad, a trackball, a keypad, or any other similar and/or suitable input device, in addition to the above-described touchscreen 110 and key input unit 120.

Figure 3:
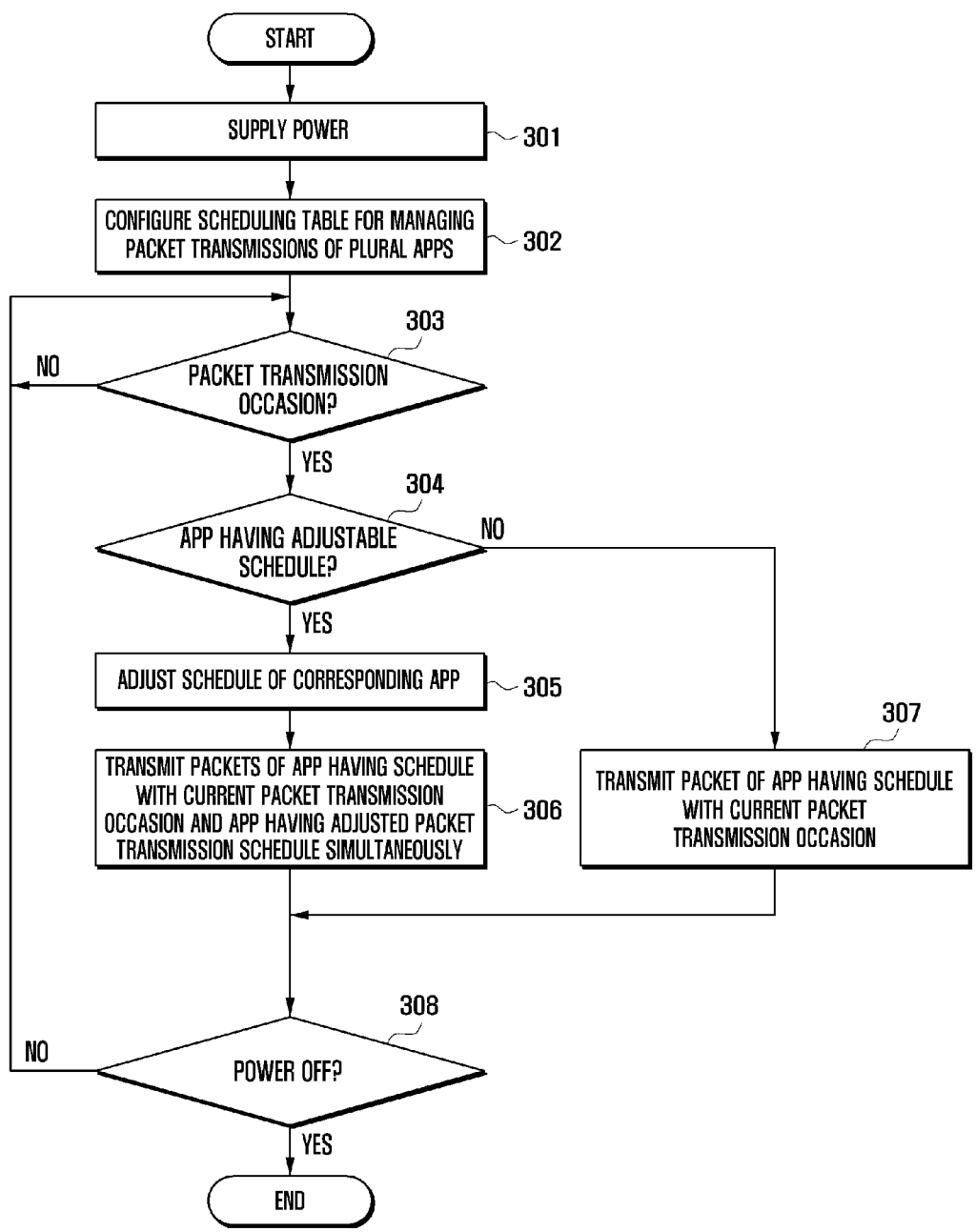
FIG. 3 is a flowchart illustrating a packet transmission method according to an exemplary embodiment of the present invention.

FIG. 3 is a flowchart illustrating a packet transmission method according to an exemplary embodiment of the present invention.

Referring to FIG. 3, if the user selects the power on/off key of the key input unit 120 in order to power on the mobile terminal 100, power is supplied from the battery to the control unit 170 such that the control unit 170 loads the OS from the storage unit 140 in order to boot up the mobile terminal 100 at step 301. Once the mobile terminal has booted up completely in step 301, the control unit 170 of the mobile terminal 100 receives packet transmission schedules from the network service applications and configures the scheduling table 145 for managing the packet transmission of a plurality of apps according to the received packet transmission schedules at step 302. As described above, the scheduling table 145 is the time table listing the packet transmission schedules in temporal order in order to manage the packet transmissions of the network service applications. After configuring the scheduling table, the control unit 170 may control the mobile terminal 100 to enter the idle mode.

In the idle mode, at step 303, the control unit 170 determines whether the current time is a packet transmission occasion of a certain application by referencing the scheduling table. If the current time is the packet transmission occasion, the control unit 170 switches from the idle mode to the packet transmission mode and proceeds to step 304. In the packet transmission mode, at step 304, the control unit 170 determines whether there is any application has an adjustable schedule and is available for schedule adjustment. At this time, the control unit 170 may determine whether the application available for the schedule adjustment fulfills the above-described determination conditions. If there is any application available for the schedule adjustment, the control unit 170 adjusts the schedule of the corresponding available application in the scheduling table 145 at step 305. That is, the control unit 170 moves up the schedule of the application available for the schedule adjustment to the current time. At this time, the control unit 170 does not change the packet transmission period of the application available for the schedule adjustment. After adjusting the schedule in step 305, the control unit 170 controls the radio communication unit 150 to simultaneously transmit the packet originally scheduled at the current occasion and the packet of which transmission scheduled is moved up to the current time at step 306. Otherwise, at step 304, if there is no application available for the schedule adjustment, then the control unit 170 controls the radio communication unit 150 to transmit only the packet scheduled at the current time at step 307. After transmitting the packet and/or packets, the control unit 170 determines whether a power-off event is detected at step 308. If no power-off event is detected, the control unit 170 switches from the packet transmission mode to the idle mode and returns the procedure to step 303.

FIGS. 4 to 11 are graphs illustrating scheduling tables for use in the packet transmission method and apparatus according to an exemplary embodiment of the present invention.

Figure 4:
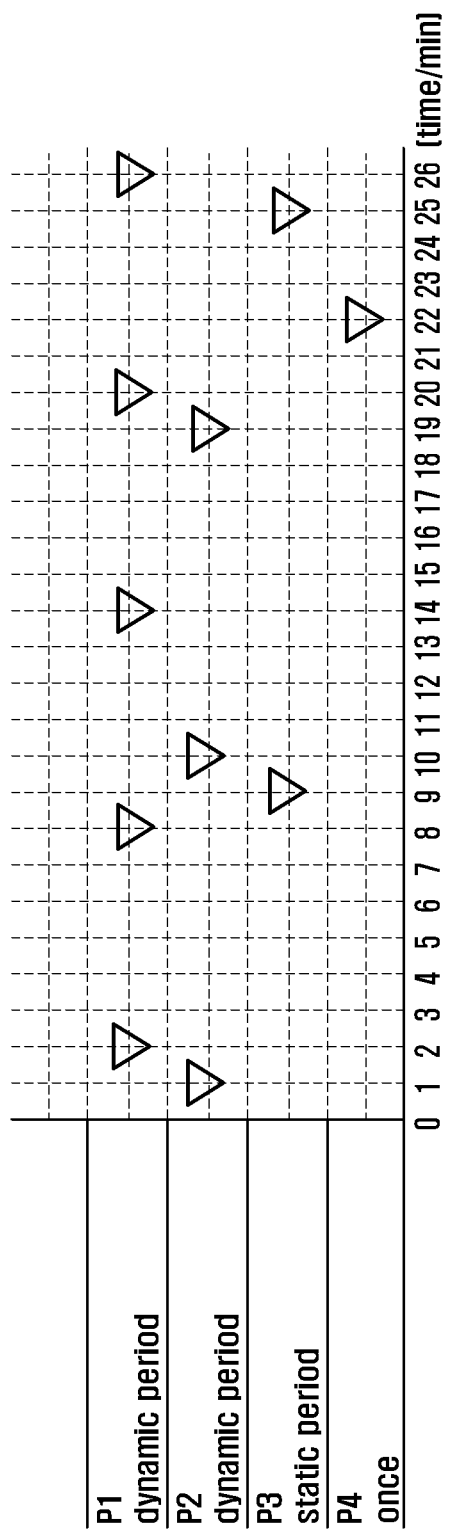
FIGS. 4 to 11 are graphs illustrating scheduling tables for use in the packet transmission method and apparatus according to an exemplary embodiment of the present invention.

Referring to FIG. 4, application P1 denotes a first push application and application P2 denotes a second push application, both available for packet transmission timing adjustment. Applications P3 and P4 denote polling applications having fixed packet transmission occasions. Here, it is assumed that P3 is a polling app which connects to the polling server at a predetermined interval and P4 is a polling app which connects to the polling server once. The control unit 170 receives the packet transmission schedules for the applications P1, P2, P3, and P4 and generates the scheduling table 145 based on the packet transmission schedules as shown in FIG. 4.

Figure 5:
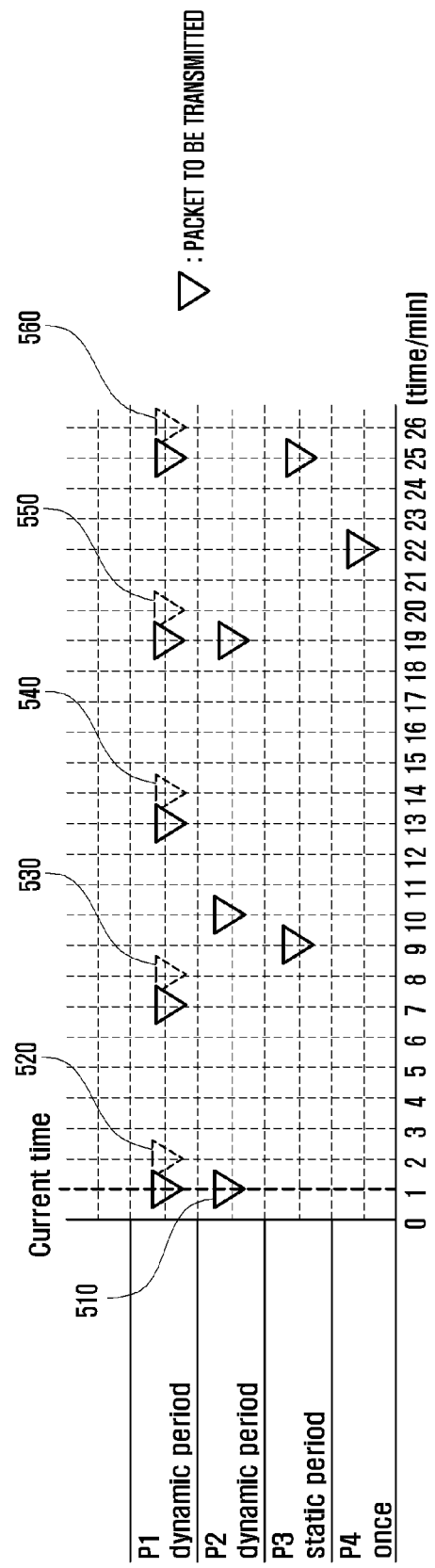

Referring to FIG. 5, a case where the current time is minute 1, which is the transmission occasion of a packet 510 of the application P2 is shown. The control unit 170 determines that a packet 520 of the application P1 is scheduled to be transmitted after 1 minute and determines that the application P1 is a push app. Accordingly, the control unit 170 respectively moves up the transmission occasions of packets 520, 530, 540, 550, and 560 of the application P1 by 1 minute. After adjusting the schedule of the application P1, the control unit 170 controls the radio communication unit 150 to transmit the packet 520 of the application P1 and the packet 510 of the application P2 simultaneously.

Figure 6:
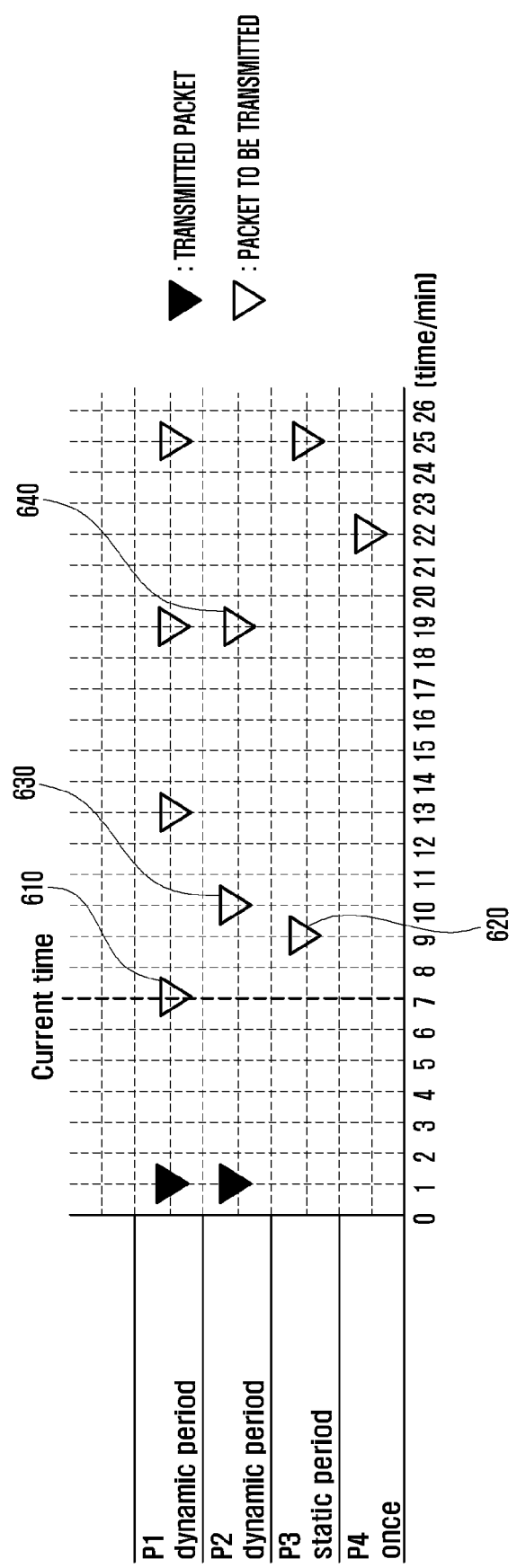

Referring to FIG. 6, a case where the current time is minute 7, which is the transmission occasion of a packet 610 of the application P1 is shown. The transmission occasion of the packet 610 has been moved up from the minute 8 to the minute 7 through the schedule adjustment. At the current time of minute 7, the control unit 170 determines that a packet 620 of application P3 is scheduled to be transmitted after 2 minutes. The control unit 170 also determines that application P3 is a polling app. Accordingly, the control unit 170 maintains the schedule of application P3 without adjustment. The control unit 170 controls the radio communication unit 170 to transmit only the packet 610 of the application P1 at the current time. If there is no schedule of the application P3 in the schedule table, the control unit 170 is capable of respectively moving up the transmission occasions of packets 630 and 640 of the application P2 by 3 minutes. If the application P3 is a push app other than the polling app, the control unit 170 is capable of adjusting the schedules of the application P2 and the application P3. However, the number of packets available to be transmitted simultaneously may be limited. For example, in a case where the number of simultaneous transmittable packets is limited to 2, the control unit 170 is capable of adjusting only the schedule of the application P3.

Figure 7:
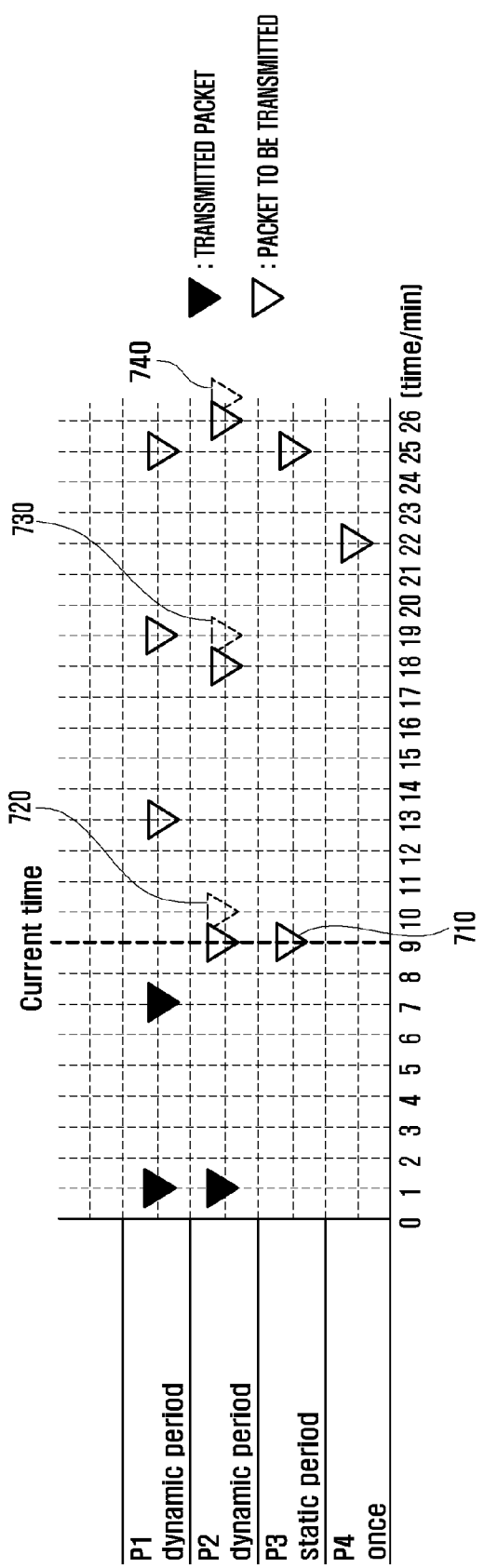

Referring to FIG. 7, a case where the current time is minute 9, which is the transmission occasion of a packet 710 of the application P3, is shown. At this time, the control unit 170 determines that a packet 720 of the application P2 is scheduled to be transmitted after 1 minute. The control unit 170 also determines that the application P2 is a push app. Accordingly, the control unit 170 respectively moves up the transmission occasions of packets 720, 730, and 740 by 1 minute. After adjusting the schedule of the application P2, the control unit 170 controls the radio communication unit 150 to simultaneously transmit the packets of the applications P2 and P3.

Figure 8:
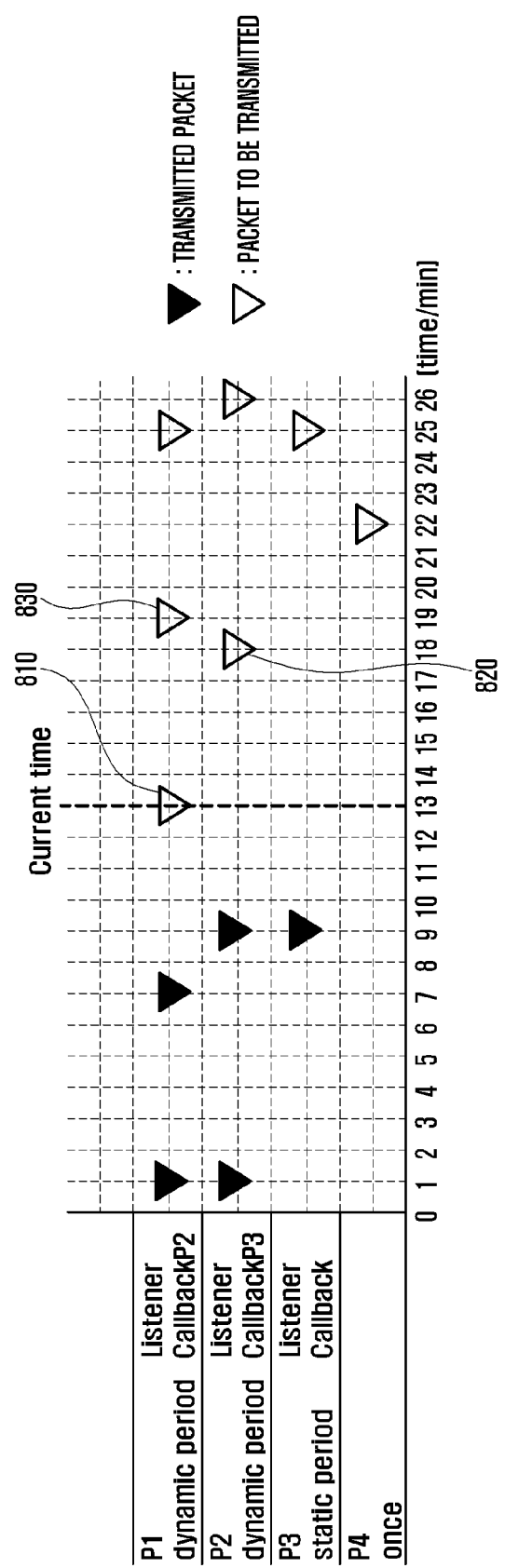

Referring to FIG. 8, a case where the current time is minute 13, which is the transmission occasion of a first packet 810 of the application P1, is shown. At this time, the control unit determines that a packet 820 of the application P2 is scheduled to be transmitted after 5 minutes. The control unit 170 also determines that a second packet 830 of the application P1 is scheduled to be transmitted after 6 minutes. That is, the control unit 170 checks that the packet 820 of the application P2 is close to the second packet 830 of the application P1 as compared to the first packet 810 of the application P1 on the time axis. In this case, the control unit 170 does not adjust the schedule of the application P2. The control unit 170 controls the radio communication unit 150 to transmit the first packet 810 of the application P1.

Figure 9:
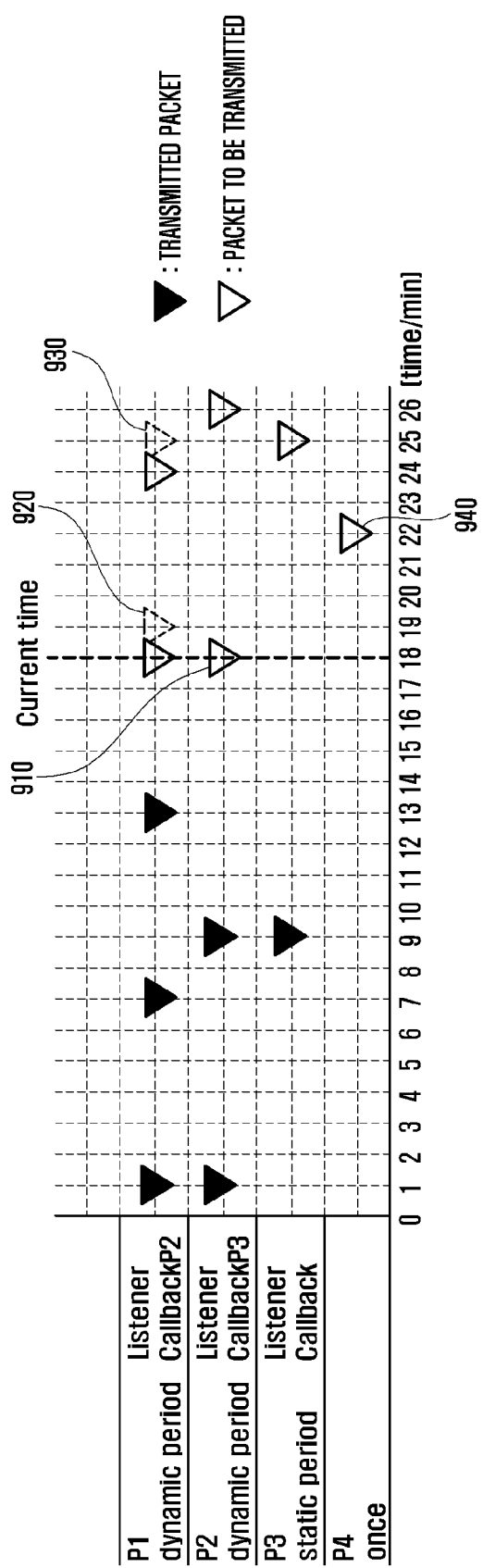

Referring to FIG. 9, a case where the current time is minute 18, which is the transmission occasion of a packet 910 of the application P2, is shown. At this time, the control unit 170 determines that a packet 920 of the application P1 is scheduled to be transmitted after 1 minute. The control unit 170 also determines that the application P1 is a push app. The control unit 170 also determines that the packet 940 of the application P4 is scheduled to be transmitted 4 minutes after the current time. Next, the control unit 170 determines that the application P4 is a polling app. In this case, the control unit 170 respectively moves up the transmission occasions of the packets 920 and 930 of the application P1 by 1 minute without adjusting the schedule of the application P4. Next, the control unit 170 controls the radio communication unit 150 to simultaneously transmit the packet 920 of the application P1 and the packet 910 of the application P2.

Figure 10:
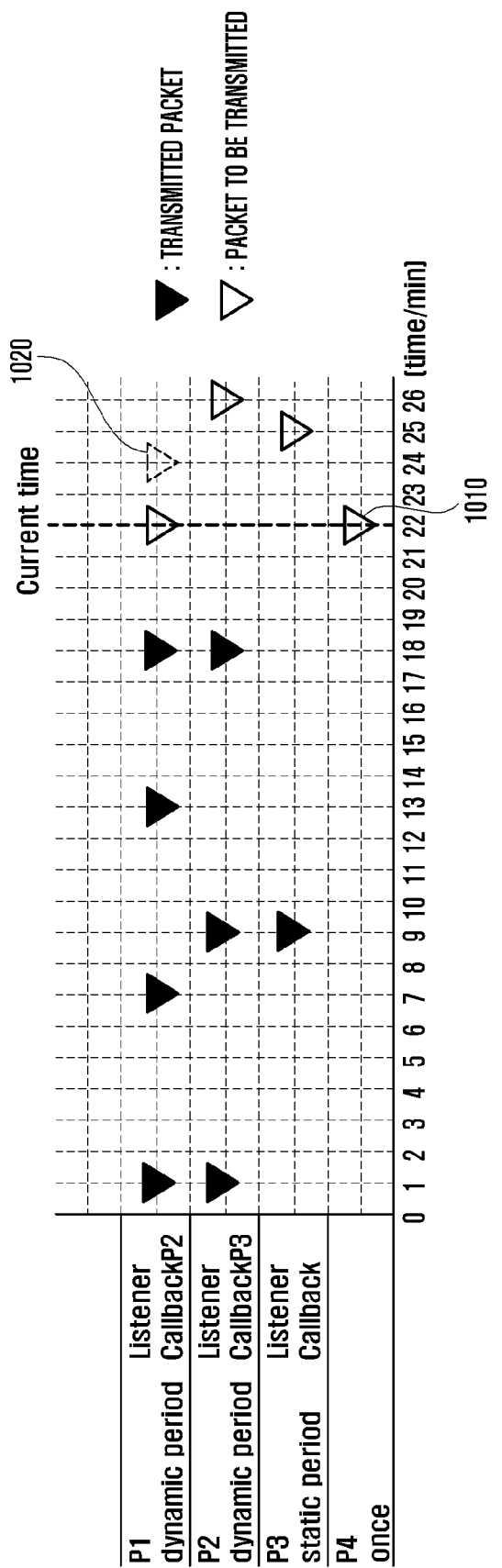

Referring to FIG. 10, a case where the current time is minute 22, which is the transmission occasion of a packet 1010 of the application P4, is shown. At this time, the control unit 170 determines that a packet 1020 of the application P1 is scheduled to be transmitted after 2 minutes. The control unit 170 also determines that the application P1 is a push app. Accordingly, the control unit 170 moves up the transmission occasion of the packet 1020 of the application P1 by 1 minute. Next, the control unit 170 controls the radio communication unit 150 to simultaneously transmit the packet 1020 of the application P1 and the packet 1010 of the application P4.

Figure 11:
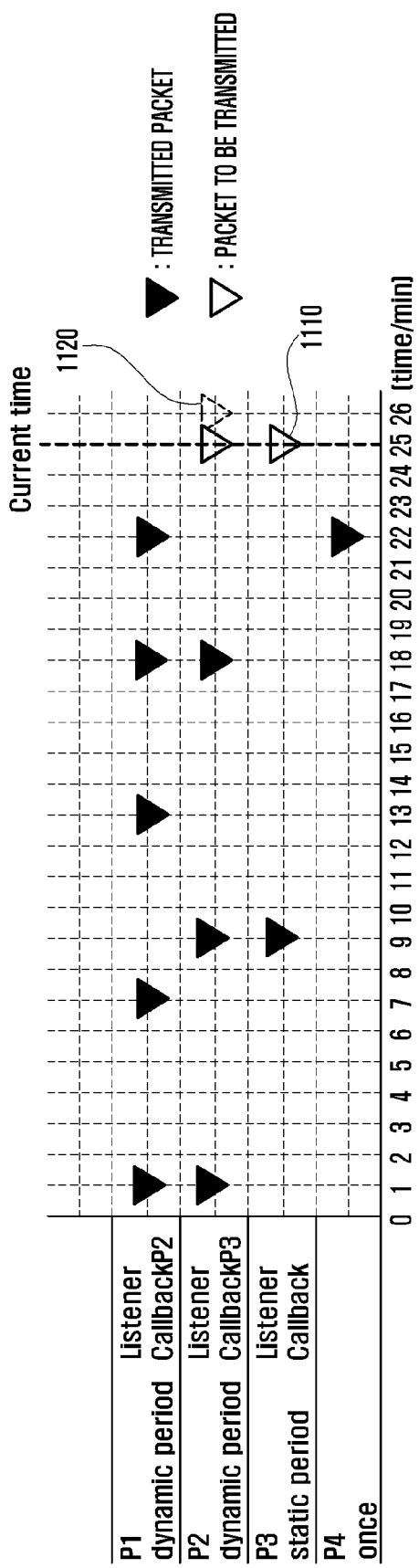

Referring to FIG. 11, a case where the current time is minute 25, which is the transmission occasion of the packet 1110 of the application P3, is shown. At this time, the control unit 170 determines that the packet 1120 of the application P2 is scheduled to be transmitted 1 minute after the current time. The control unit 170 also determines that the application P2 is a push app. Accordingly, the control unit 170 moves up the transmission occasion of the packet 1120 of the application P2 by 1 minute. Next, the control unit 170 controls the radio communication unit 150 to simultaneously transmit the packet 1120 of the application P2 and the packet 1110 of the application P3 simultaneously.

As described above in FIGS. 5 to 11, the control unit 170 wakes up 7 times to operate in the packet transmission mode for 26 minutes. If the original schedules are applied, as depicted in FIG. 4, the control unit 170 will wake up 11 times to operate in the packet transmission mode for 26 minutes. This means that the packet transmission method of the exemplary embodiments may reduce the wakeup times for packet transmission so as to save power, resulting in increase of the mobile terminal usage time. Furthermore, the packet transmission method of the exemplary embodiments may reduce the number of wakeups to enter the packet transmission mode without unnecessary packet transmission, resulting in minimization of traffic load.

As described above, the packet transmission method and apparatus of the exemplary embodiments may prolong the usage time of the mobile terminal by simultaneously transmitting as many packets generated by different applications as possible while minimizing potential traffic overload.

The packet transmission method of the exemplary embodiments may be implemented in the form of computer-executable program commands and stored in a non-transient computer-readable storage medium. The non-transient computer readable storage medium may store the program commands, data files, and data structures in individual or combined forms. The program commands recorded in the non-transient computer-readable storage medium may be designed and implemented for various exemplary embodiments of the present invention or used by those skilled in the computer software field. The non-transient computer-readable storage medium includes magnetic media, for example a floppy disk and a magnetic tape, optical media including a Compact Disc (CD) Read Only Memory (ROM) and a Digital Video Disc (DVD) ROM, a magneto-optical media, for example as a floptical disk, and a hardware device designed for storing and executing program commands, for example ROM, Random Access Memory (RAM), and flash memory. The programs commands include the language code executable by computers using an interpreter as well as machine language codes created by a compiler. The aforementioned hardware device may be implemented with one or more processors (e.g. controllers) for processing one or more software modules to execute the operations of the various exemplary embodiments of the present invention.

The packet transmission method and apparatus of exemplary embodiments of the present invention may be practiced with modification and alteration within the spirit and scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A packet transmission method of a mobile terminal, the method comprising:
   identifying at least one other network service application being able to transmit at least one packet at an event time of a packet transmission schedule of a first network service application;
   adjusting a packet transmission schedule of the identified at least one other network service application to be synchronized with the packet transmission schedule of the first network service application; and
   transmitting at least one packet of the first network service application according to the packet transmission schedule of the first network service application and transmitting at least one packet of the at least one other network service application according to the synchronized packet transmission schedule of the at least one other network service application,
   wherein the identified at least one other network service application comprises a client program of a push data delivery service.

2. The method of claim 1, wherein the identifying of the at least one other network service application comprises determining the identified at least one other network service application having an adjustable packet transmission occasion to be the network service application having an adjustable packet transmission schedule.

3. The method of claim 2, wherein the client program of the push data delivery service is a push application which periodically transmits a keep-alive packet for maintaining a connection to a server.

4. The method of claim 3, wherein the adjusting of the packet transmission schedule of the identified at least one other network service application comprises moving up the packet transmission schedule of the identified at least one other network service application to the packet transmission schedule of the first network service application.

5. The method of claim 4, wherein the adjusting of the packet transmission schedule of the identified at least one other network service application comprises skipping, when the identified at least one other network service application is a polling application, the packet transmission schedule of the identified at least one other network service application to synchronize the packet transmission schedule of the first network service application.

6. The method of claim 1, further comprising transmitting, when the identified at least one other network service application having an adjustable packet transmission schedule does not exist, only at least one packet of the first network service application.

7. The method of claim 1, further comprising switching, after the transmitting of the at least one packet of the first network service application, to an idle mode for minimizing consumption of electric current by the mobile terminal.

8. The method of claim 1, wherein the adjusting of the packet transmission schedule of the identified at least one other network service application comprises at least one of configuring two packet transmission schedules to be identical to each other, configuring at least one event time of each of the two packet transmission schedules to be identical to each other, and configuring a period of one packet transmission schedule to be a multiple of a period of another packet transmission schedule.

9. A packet transmission apparatus of a mobile terminal, the apparatus comprising:
a control unit configured to identify at least one other network service application being able to transmit one or more packets at an event time of a packet transmission schedule of a first network service application, and to adjust a packet transmission schedule of the identified at least one other network service application to be synchronized with the packet transmission schedule of the first network service application; and
a radio communication unit configured to transmit at least one packet of the first network service application according to the packet transmission schedule of the first network service application and to transmit at least one packet of the at least one other network service application according to the synchronized packet transmission schedule of the at least one other network service application,
wherein the identified at least one other network service application comprises a client program of a push data delivery service.

10. The apparatus of claim 9, further comprising a scheduler configured to determine the identified at least one other network service application having an adjustable packet transmission occasion to be the identified at least one other network service application having an adjustable packet transmission schedule.

11. The apparatus of claim 10, wherein the client program of the push data delivery service is a push application which periodically transmits a keep-alive packet for maintaining a connection to a server.

12. The apparatus of claim 11, wherein the scheduler is further configured to move up the packet transmission schedule of the identified at least one other network service application to the packet transmission schedule of the first network service application.

13. The apparatus of claim 12, wherein the scheduler is further configured to skip, when the identified at least one other network service application is a polling application, the packet transmission schedule of the identified at least one other network service application to synchronize the packet transmission schedule of the first network service application.

14. The apparatus of claim 10, wherein the scheduler is further configured to control the radio communication unit to transmit, when the identified at least one other network service application does not exist, only the packet scheduled to be transmitted at the current time.

15. The apparatus of claim 9, wherein the control unit wakes up, at a time of a packet transmission occasion, from an idle mode for conserving electric current.

16. The apparatus of claim 9, wherein the control unit is further configured to control at least one of configuring two packet transmission schedules to be identical to each other, configuring at least one event time of each the two packet transmission schedules to be identical to each other, and configuring a period of one packet transmission schedule to be multiple of a period of another packet transmission schedule.

* * * * *